United States Patent
Woodworth et al.

(10) Patent No.: US 11,550,833 B2
(45) Date of Patent: Jan. 10, 2023

(54) ARCHITECTURE FOR SEMANTIC SEARCH OVER ENCRYPTED DATA IN THE CLOUD

(71) Applicant: University of Louisiana at Lafayette, Lafayette, LA (US)

(72) Inventors: Jason Woodworth, Lafayette, LA (US); Mohsen Amini Salehi, Lafayette, LA (US)

(73) Assignee: University of Louisiana at Lafayette, Lafayette, LA (US)

(*) Notice: Subject to any disclaimer, the term of this patent is extended or adjusted under 35 U.S.C. 154(b) by 622 days.

(21) Appl. No.: 16/168,919

(22) Filed: Oct. 24, 2018

(65) Prior Publication Data
US 2019/0121873 A1 Apr. 25, 2019

Related U.S. Application Data

(60) Provisional application No. 62/576,302, filed on Oct. 24, 2017.

(51) Int. Cl.
*G06F 16/33* (2019.01)
*G06F 16/35* (2019.01)
*G06F 21/62* (2013.01)

(52) U.S. Cl.
CPC ........ *G06F 16/3338* (2019.01); *G06F 16/353* (2019.01); *G06F 21/6218* (2013.01)

(58) Field of Classification Search
CPC .. G06F 16/338; G06F 16/353; G06F 21/6218; G06F 16/33; G06F 16/35; G06F 21/62
See application file for complete search history.

(56) References Cited

U.S. PATENT DOCUMENTS

| | | | | |
|---|---|---|---|---|
| 6,732,091 B1* | 5/2004 | Middelfart | ........ | G06F 16/24542 707/718 |
| 7,007,006 B2* | 2/2006 | Zilio | ........ | G06F 16/22 707/717 |
| 7,512,814 B2* | 3/2009 | Chen | ........ | G06F 21/602 713/158 |
| 8,037,057 B2* | 10/2011 | Burger | ........ | G06F 16/2272 707/715 |
| 9,646,166 B2* | 5/2017 | Cash | ........ | G06F 21/6218 |
| 2006/0271353 A1* | 11/2006 | Berkan | ........ | G06F 40/289 704/9 |
| 2015/0229611 A1* | 8/2015 | Kaushik | ........ | H04L 9/30 713/162 |
| 2016/0366113 A1* | 12/2016 | Dawoud | ........ | G06F 16/14 |
| 2018/0157978 A1* | 6/2018 | Buda | ........ | G06N 20/00 |

* cited by examiner

*Primary Examiner* — Miranda Le
(74) *Attorney, Agent, or Firm* — Kean Miller LLP; Russel O. Primeaux; Lauren J. Rucinski

(57) ABSTRACT

An architecture for semantic search over encrypted data that improves upon existing encrypted data search techniques by providing a solution that is space-efficient on both the cloud and client sides, considers the semantic meaning of the user's query, and returns a list of documents accurately ranked by their similarity to the query. Different search schemes are presented based on S3C architecture (namely, FKSS, SKSS, and KSWF) that are fine-tuned for different types of datasets. The system requires only a single plaintext query to be entered and is easily portable to thin-clients, making it simple and quick for users to use. The system is also shown to be secure and resistant to attacks.

8 Claims, 12 Drawing Sheets

FIGURE 2

"Failure in Wireless Sensor Networks", "Failure Wireless Sensor", "Wireless Sensor Networks", "Failure Wireless", "Wireless Sensor", "Sensor Networks", "Failure", "Wireless", "Sensor", "Networks"

FIGURE 3

- Category 1 - Specific:
  IBM Research Report (IRR)
  Licklider Transmission Protocol (LTP)
  Multicast Listener Discovery Protocol (MLDP)
- Category 2 - Broad:
  Internet Engineering (IE)
  Transmission Control Protocol (TCP)
  Cloud Computing (CC)
  Encryption (EN)

ARCHITECTURE FOR SEMANTIC SEARCH OVER ENCRYPTED DATA IN THE CLOUD

CROSS REFERENCE TO RELATED APPLICATIONS

This application claims priority to U.S. Provisional Application No. 62/576,302, "ARCHITECTURE FOR SEMANTIC SEARCH OVER ENCRYPTED DATA IN THE CLOUD," filed Oct. 24, 2017.

STATEMENT REGARDING FEDERALLY SPONSORED RESEARCH OR DEVELOPMENT

Not Applicable.

REFERENCE TO A "SEQUENCE LISTING," A TABLE, OR A COMPUTER PROGRAM

Not Applicable.

DESCRIPTION OF THE DRAWINGS

The drawings constitute a part of this specification and include exemplary embodiments of the ARCHITECTURE FOR SEMANTIC SEARCH OVER ENCRYPTED DATA, which may be embodied in various forms. It is to be understood that in some instances, various aspects of the invention may be shown exaggerated or enlarged to facilitate an understanding of the invention. Therefore the drawings may not be to scale.

FIG. 2 is a sample of the query splitting done by Architecture for Semantic Search over Encrypted Data in the Cloud ("S3C").

FIG. 3 displays queries used for testing relevance. Queries in "Category 1" target a small set of specific, known documents within the collection, while queries in "Category 2" target a broad set of documents not necessarily known to the user.

BACKGROUND

Figure 1:
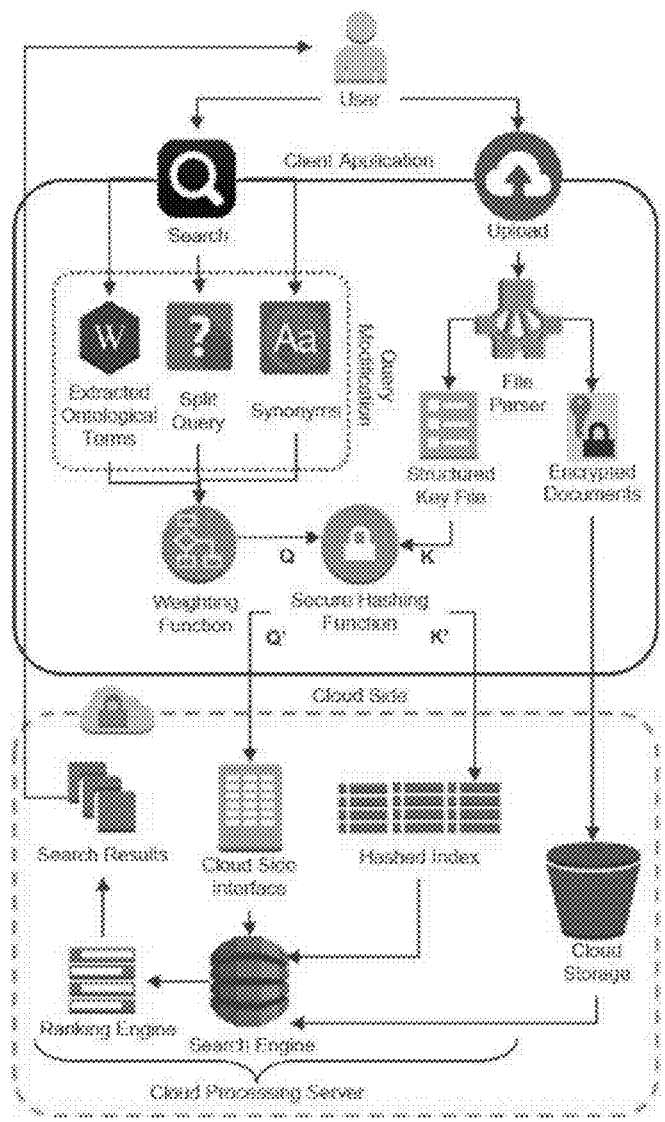
FIG. 1 is an overview of the inventive architecture and processes. Parts within the solid-line group indicate items or processes on the client side which are considered trusted. Parts in the dashed-line group indicate those in the cloud processing server. All components in the cloud are considered untrusted.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. In the following description, numerous specific details are provided, such as examples of datasets, queries, and user interface devices. One skilled in the relevant art will recognize, however, that ARCHITECTURE FOR SEMANTIC SEARCH OVER ENCRYPTED DATA may be practiced without one or more of the specific details, or with other methods, components, materials, and so forth. In other instances, well-known structures, materials, or operations are not shown or described in detail to avoid obscuring aspects of the invention.

Cloud storage is an efficient and scalable solution for companies and individuals who want to store large numbers of files without the burden of maintaining their own data center. Cloud storage is a service model in which data is maintained and managed remotely and made available to the end user over a network. Despite the advantages offered by these solutions, many potential clients avoid cloud storage because of valid security concerns as the files are hosted on remote servers. The traditional method of security for cloud storage is encryption of user files performed on the provider's server. The providers then store the encryption key remotely. This method allows internal attackers to access unauthorized data. One proven solution that addresses this concern is to perform the encryption locally on the user's machine before it is transferred to the cloud. Unfortunately, this limits the user's ability to interact with the data, most importantly, limiting the ability to search over it. Although solutions for searchable encryption exist, they often do not consider the semantic meaning of the user's query, impose a large storage overhead, and/or do not rank documents based on their relevance to the query. Therefore, a new method is needed that allows user data to be encrypted before being remotely stored by the provider and allows the user to effectively and efficiently search over the data.

Such a new method would be especially useful in industries in which the user needs near instantaneous access to encrypted data stored on a cloud server from a thin client device such as a tablet, PDA, etc. These users may not remember exact keywords in the files they are looking for and/or may also want to retrieve similar files. One example of such a user is a hospital organization. Hospitals maintain encrypted patient records on the cloud which need to be accessed and searched by medical professionals for patient information and diagnostic comparisons. Many hospitals perform these types of searches on tablet devices. A second example is a police department. Police officers require the ability to search over encrypted police records on a local or state government cloud server. Like health care workers, police officers need access to the information while on the move (such as with a PDA). Organizations like these and many other cloud services users would benefit from a system that not only provides security for their files, but also provides a searching mechanism with a plaintext search query and relevancy-ranked results.

Previously available systems fall short in at least three ways. First, they do not offer semantic searching—i.e., the user is required to remember exact keywords in the documents for which they are searching. Second, any previous system that may offer some type of semantic searching is either only designed to tolerate typos or similar spelled words or requires large semantic networks that need to be stored locally making them inappropriate for thin-clients. Third, even if semantic searching is offered, no such previous system ranks the related files by relevance to the query. Rather, previous systems offer only a boolean search, which returns a potentially huge pool of all related files. Therefore, in one embodiment or another, the present invention offers a method for semantically searching a multi-phrase query over encrypted files stored in the cloud, which ranks the results of the search based on semantic relevance to the user's query and does not reveal the data to the cloud when the search is processed. The system also imposes the minimum storage and processing overhead.

Solutions for searchable encryption ("SE") are imperative for privacy preservation on the cloud. The majority of previously available SE solutions follow one of two main approaches. The first major approach is to use cyryptographic algorithms to search the encrypted text directly. This approach is provably secure and requires no storage overhead on the server. However, solutions utilizing this method are generally slower, especially when operating on large storage blocks with large files. In this approach, each word in a document is encrypted independently and the documents are sequentially scanned while searching for tokens that match the similarly encrypted query. A similar system utilizes public key encryption to write searchable encrypted text to a server from any outside source. But this system could only be searched over by using a private key. While methods following this first major approach are secure, they often only support equality comparison to the queries, meaning they simply return a list of files containing the query terms without ranking.

The second major, previously available approach is to utilize database and text retrieval techniques, such as indexing, to store selected data per document in a separate data structure from the files. This approach generally provides a faster search operation making it well adapted to big data scenarios. For example, one method following this approach uses bloom filters that create a searchable index for each file containing trapdoors of all unique terms. But this method returns false positives because of the choice in data structure. Another example method using this second major approach keeps a single hash table index for all documents, which removes the false positives introduced by bloom filters. The hash table index for all documents contains entries where a trapdoor of a word which appeared in the document collection is mapped to a set of file identifiers for the documents in which it appeared. Finally, a third method using this second major approach, uses an array of bits where each bit is either 0 or its position represents one of the document identifiers. Although all three of these methods produce relatively fast searches, they are less provably secure, opening up new amounts of data to potential threat.

Importantly, all of the mentioned methods only offer an exact-keyword search, leaving no room for user error through typos and all cannot retrieve works related to terms in the query. Methods that have attempted to provide a semantic searching often only consider word similarity instead of true semantics. These methods may be able to handle minor user typos through a fuzzy keyword search but do not offer expansive semantic searching. For example, one previous method searches for matches for similar keywords to the user's query by using the edit distance as a similarity metric. This only allows for words with similar structures and minor spelling differences to be matched. Others are capable of searching for regular expressions, use stemming methods, or mining techniques. Each still neglects true semantics and/or builds a semantic network only using the documents that are given to the set.

The Architecture for Semantic Search over Encrypted Data in the Cloud ("S3C") presented herein provides a secure semantic search over encrypted data hosted in the cloud. S3C is a scalable system that performs a semantic search on locally encrypted data that is hosted on the cloud. The user's machine is the only part of the architecture that sees plaintext data. Documents are parsed and indexed in a manner that takes constant storage space per document. The search system resides on the cloud server, relieving the client machine of the search processing. Users are able to upload documents to a remote storage location, perform a semantic search over their encrypted data, and receive a list of documents ranked by their relevance to the query. Experiments that we have performed on real-world datasets demonstrate the accuracy, performance, and scalability of S3C.

DETAILED DESCRIPTION

The invention, Architecture for Semantic Search over Encrypted Data in the Cloud ("S3C"), is a system that provides true semantic search functionality over encrypted data stored in the cloud, i.e.—on a remote server accessible through the internet. S3C combines approaches from traditional keyword-based searchable encryption and semantic web searching. It offers a user a transparent experience that accepts a simple, multi-phrase query and returns a list of documents ranked by semantic relevance to the query. The system is space-efficient, which makes it suitable for large scale datasets. The minimal processing required allows the system to be run on thin clients such as smart-phones or tablets. The performance of SC3 against various real-world datasets shows that it produces accurate search results while maintaining minimal overhead storage.

As used herein, the terms or phrases relevant to multi-phrase searching are defined as following: "vocabulary of plaintext words," $V=\{v_1, v_2, v_3, \ldots, v_n\}$ which constitutes a language (e.g., English); "document," $d_i=\{d_{i1}, d_{i2}, d_{i3}, \ldots, d_{in}\}$ where $d_i \in V$; "multi-phrase query," $q=\{q_1, q_2, q_3, \ldots, q_n\}$ where $q_i \in V$; "collection of documents," $C=\{d_1, d_2, d_3, \ldots, d_N\}$; and "list of relevant documents $R(q) \subseteq C$ where R is a function for determining relevance based on a query. The aim of the search system is to find R(q) using q as a guide for what elements of C it should contain. To ensure the results of R(q) are as relevant as possible, semantics are added to the search process. The subsequent related terms are defined as follows: "modification process," M(q) which enriches q with semantic data; "modified query set," $Q$ =M (q) which contains additional related terms and ideas related to q; and "weighting system," W($Q$) to weight the terms in $Q$ based on their closeness (relevance level) to the original query. Introducing semantic data to the search process allows the system to return results that are more meaningfully related to the original query. Weighting is utilized to ensure that the original terms in a document contribute more to that document's ranking than a related term. Finally, the introduction of encryption adds the following element definitions: "ciphertext version of the original Vocabulary," $V'=\{H(v_1), H(v_2), H(v_3), \ldots, H(v_n)\}$ where H is a hash function; "collection of encrypted documents," $C'=\{E(d_1), E(d_2), E(d_3), \ldots, E(d_N)\}$ where E is an encryption method; and "list of relevant documents," $R'(q) \subseteq C'$. The search finds the relevant list of elements in C' while still using a plaintext multi-phrase query. The search also produces a R'(q) as similar to R(q) as possible.

S3C has three main components: the client application, the cloud processing server, and the cloud storage. The lightweight ("thin") client application is hosted on the user's machine, and is the only system in the architecture that is assumed to be trusted. Both cloud units are expected to be maintained by a third party cloud provider and are thus considered "honest but curious." In the threat model used herein, both cloud systems and the network channels between all machines should be considered open to both external and internal attacks. FIG. 1 presents an overview of the three components and processes associated with them in the system. Parts within the solid-line group indicate items or processes on the client side which are considered trusted. Parts in the dashed-line group indicate those in the cloud processing server. All components in the cloud are considered untrusted.

The client application provides an interface for the user to perform a document upload or to search over the data in the cloud. It is responsible for parsing and extracting keywords from plaintext documents and encrypting them before they are uploaded to the cloud. When the user requests to search, S3C expands the query based on the system's semantic scheme and transforms the query into the secure query set (i.e., trapdoor) to be sent to the cloud. The user will then receive a ranked list of documents and can then select a file for the system to download and decrypt.

The cloud server is responsible for constructing and updating the inverted index and other related data structures based on the parsed and processed data sent from the client. The structures are created entirely out of hashed tokens to keep the server oblivious to the actual file content. When the server detects that the client has requested to search, it will receive the trapdoor, perform the search over its index, and gives each related document a score. Once the highest ranking documents are determined, the server can request to retrieve them from the cloud storage and send them back to the client. The cloud storage block is used to store the encrypted files that the user uploads. It will not see any representation of the user's query. The storage can potentially span multiple clouds, so long as the cloud server knows where each document is stored and the index is updated accordingly.

The searching method is agnostic towards the meaning of the terms in the documents and the query; it only considers their occurrence and frequency. This allows the search to be performed over encrypted data. Thus, occurrences of a distinct word in every document must be transformed into the same token, and consequently, the same transformation must be applied when that word appears in the search query. This process ensures that the match is produced during the search process. In one embodiment, hashing is used to achieve this result. One skilled in the art would understand that there are many available hashing functions. In one embodiment, the Okapi BM25 algorithm, frequently used for standard text retrieval, is used. This search algorithm is a term-frequency, inverse-document-frequency model that works using an inverted index. The algorithm does not consider the actual meaning of the terms in the document; instead, it determines the documents in which the terms exist.

The upload process parses the desired document into indexable information and encrypts the document before it is sent to the cloud. In one embodiment, a subset of terms from the document (termed keywords) is selected to represent the semantics of that file. In addition, term frequency of the keywords within that document is gathered, the terms are transformed individually into their hashed form, and then the terms are written to a temporary key file. The key file is sent to the cloud along with the full encrypted text file. Once the cloud processing server receives the encrypted document file and associated key file, it moves the encrypted document into storage. Then the terms and frequencies in the key file will be added to the hashed index, which associates a hashed term with a list of documents it appeared in. The size of the uploaded document is also recorded within the index. In one or more embodiments, SC3 supports batch uploading of many data files at once and processes them as a series of individual files with linear complexity.

Clustering may be performed after the upload process. In one or more embodiments, topic-based clustering on the hashed index is performed and only related clusters are searched over.

The search process consists of two main phases: query modification and index searching and ranking. In one embodiment, the query modification phase begins with the user entering a plaintext query into the client application. The query is then modified on the client side and sent to the cloud processing server where index searching and ranking is performed. The process of query modification takes in the original query, q, and expands into the modified query set, $Q$. This process involves three phases: query splitting, semantic expansion, and weighting.

In the query splitting phase, a multi-phrase string hashes to a different value than the sum or concatenation of the hash values of its parts. Once on the cloud, the terms must match the entries in the hashed index exactly. Therefore, splitting the query breaks q into smaller components. Once this phase is complete, $Q$ will consist of q and its split parts.

In order to achieve semantic expansion, the system injects semantic data through the use of online ontological networks. The simplest approach is to perform a synonym lookup for each member of $Q$ (termed $Q_i$) through an online thesaurus and add the results to $Q$. This assures that the search results will include documents containing terms synonymous with, but not exactly matching, the user's query. However, this approach alone does not cover ideas that are semantically related to the user's query, but are not synonymous. Therefore, S3C pulls from more advanced ontological networks. In one embodiment, entries from, for example, Wikipedia (an online, collaborative encyclopedia website) are pulled and the system performs key-phrase extraction to retrieve related terms and phrases (hereafter referred to as "related terms"). These related terms are then added to $Q$. Thus, a search can retrieve documents that contain concepts more abstractly related to the user's query (e.g., related diseases). In addition, the use of online resources relieves the client of the need to store semantic networks locally. As new online semantic networks are added to the internet and made available for applications, they too could be extracted from and added to the query as part of the semantic processing step. Thus, in other embodiments, other advanced ontological systems are used.

Weighting ensures that the search results are more relevant to the user's original query than the synonyms and related terms. For example, a document that matches the entire original query should be weighted higher and considered more relevant than a document that only matches synonyms. Thus SC3 introduces the following weighting scheme with weights ranging from 0 to 1: (1) the original query, q, is weighted as 1; (2) results of query splitting are weighted as 1/n where n is the number of terms derived from splitting; and (3) synonyms or related terms of a term $Q_i$ are weighted as $W(Q_i)/m$, where $W(Q_i)$ is the weight of $Q_i$ and m is the number of synonyms or related terms derived from $Q_i$. These weights are added to all members of $Q$ to complete the modified query set.

Once the entirety of $Q$ is built, its members are hashed to create the trapdoor $Q'$ which is sent to the cloud to perform the index search and ranking. On the cloud processing server, the system goes through each member of $Q'$ and checks them against the hashed index to compile a list of files that could be considered related to the query. These related files are further ranked using a modification of the BM25 equation described in the following equations:

$$r(d_i, Q') = \sum_{i=1}^{n} IDF(Q'_i) \cdot \frac{f(Q'_i, d_i) \cdot (\alpha + 1)}{f(Q'_i, d_i) + \alpha \cdot (1 - \beta + \beta \cdot \frac{|d_i|}{\delta})} \cdot W(Q'_i) \quad (1)$$

"IDF" in this equation refers to the inverse document frequency for the term, which can be defined as:

$$IDF(Q'_i) = \log \frac{N - n(Q'_i) + 0.5}{n(Q'_i) + 0.5} \quad (2)$$

The terms in these equations are as follows: $Q_i$ is an individual term in the original plaintext query; $Q'_i$ is the hashed version of $Q_i$ in the hashed query set; $r(d_i, Q')$ is the ranking score attributed to document $d_i$ for hashed query set $Q'$; $f(Q'_i, d_i)$ is the frequency of term $Q_i$ in document $d_1$; N is the total number of documents in the collection, C; $n(Q'_i)$ is the total number of documents containing the query term $Q_i$; $|d_i|$ is the length of document, $d_i$ in words; d is the average length of all documents in C; $W(Q'_i)$ is the weight associated with term $Q_i$; $\alpha$ and $\beta$ are constants (in one embodiment, the values are 1.2 and 0.75, respectively).

The cloud processing server computes this equation for all documents in the collection and returns the list to the client. In one embodiment, the list is sorted by score in descending order; however, in other embodiments the user may chose the sorting order.

Various embodiments consider three main schemes for selecting the subset of terms to represent the document, splitting the user search query, and performing ranking. In one embodiment, a simple (or naïve, less sophisticated) Full Keyword Semantic Search ("FKSS") is used. FKSS follows the naïve method of selecting terms as keywords. It simply collects and counts the frequency of each individual word that is not considered a stopword. This embodiment gives the hashed index the full scope of the document so that no meaningful text is left out, but enlarges the hashed index with possibly unneeded terms. FKSS also follows a naïve method of splitting the query. Because the keyword selection for the hashed index only considers single words, FKSS divides the query into singular words. Thus, splitting the query into larger groups of words adds no value. Ranking for FKSS is performed with no modification to Equation (1).

Although FKSS follows a naïve approach, it can be useful for scenarios in which relatively small-sized documents are used. It can also be useful if full document text consideration is integral. Some examples for which FKSS is applicable include: searching over encrypted media tags or social media updates. It is the least secure scheme, however, as it leaves the frequency of keywords of each document in the hashed index.

In another embodiment, Selected Keyphrase Semantic Search ("SKSS") is used to create a space-efficient index. SKSS runs the document through a keyphrase extractor to obtain a constant number of the most important keywords and phrases within the document (in one embodiment, 10 keyphrases are collected). These phrases can be considered to convey general information on the subject and contents of the document. The keyphrases are divided into individual, distinct words so that the key file sent to the server contains both hashed representations of the full phrase and each word within it. The use of a constant number of terms per document keeps storage overhead small. It also increases security as only a small portion of the document is stored in the hashed index. In this embodiment, term frequency is eliminated because each term is considered to be equally important to the meaning of the document. Thus, each term can be considered equally frequent within the document.

SKSS splits the query not only into individual words, but also into all possible adjacent subsets. FIG. 2 depicts this type of split. While some of the phrases added to the set might be meaningless ("Failure Wireless Sensor," for example), others will carry meaning that will be important during the semantic lookup ("Sensor Networks," for example). Once the splitting is complete, synonyms and related terms are looked up for all of the resulting phrases in the query set. When performing ranking, SKSS modifies Equation (1) to compensate for the lack of frequency data. Because the keyphrase extractor pulls a limited number of terms from the document, all extracted phrases are considered equally frequent. Thus, a "1" is put in place of $f(q_i, d_i)$.

In another embodiment, Keyphrase Search with Frequency ("KSWF") is used. KSWF is a combination of the two previous schemes. The keyphrase extractor is used to obtain keywords for the index, similar to SKSS, and the phrases are then split into individual words. Subsequently, the scheme makes a second pass through the document to collect the frequency information for each word and phrase, similar to FKSS, which is then stored alongside the terms in the index. The user query is split in the same manner as SKSS, with each adjacent subset added to the overall query set. Because the frequency data is now present for all of the terms and phrases, it uses the same ranking method as FKSS. This scheme was developed primarily to analyze the impact of utilizing term frequency with a method like SKSS. Intuitively, adding term frequency should bring up more relevant search results, as more accurate data is available for the ranking. The addition of frequency data to KSWF offers creates greater accuracy in the ranking function. For this reason, it is useful in scenarios in which the highest accuracy possible is desired while maintaining minimal storage overhead.

S3C provides a trustworthy architecture for storing confidential information securely in clouds while maintaining the ability to search over them. The only trusted component of the architecture is the user machine, which has access to all sensitive information such as the full plaintext documents and the document key files. Keeping the client machine trusted is a reasonable assumption, as it can be kept with minimal exposure to outside attackers.

The threat model assumes that adversaries may intend to attack the communication streams between client and cloud processing server and between cloud processing server and cloud storage, as well as the cloud processing server and storage machines themselves. Relevant terms are defined as follows. For a multi-phrase query q on a collection of documents C, a history, $H_q$, is defined as the tuple (C, q), i.e.—a history of searches and interactions between client and cloud server. The "view" is whatever the cloud can actually see during any given interaction between client and server. In one embodiment, this includes the hashed index I over the collection C, the trapdoor of the search query terms (including its semantic expansion) $Q'$, and the number and length of the files, and the collection of encrypted documents C'. $V(H_q)$ is this view. The "trace" is the precise information leaked about Hq. In one embodiment, this includes file identifiers associated with the search results of the trapdoor $Q'$.

S3C allows the attacker to infer as little information about $H_q$ as possible. In one embodiment, the view and trace are the only elements the attacker may be able to access. In other embodiments, it is assumed that the chosen encryption and hashing methods are secure, so C' itself will not leak any information. I only shows a mapping of a single hashed term or phrase to a set of file identifiers with frequencies. This means that a distribution of hashes to files could be compiled, but minimal data will be gained from the construction. Similarly, $Q'$ only displays a listing of hashed search terms with weights. The addition of the weights could potentially enable the attacker to infer which terms in the trapdoor were parts of the original query, but the attacker would still only have a smaller set of hashed terms.

If the attacker was able to gain knowledge of the hash function used on the client side, the attacker could, in theory, build a dictionary of all words in the vocabulary, V, mapped to their hashed counterparts, and reconstruct I in plaintext. In this scenario, the attacker could put together the terms that comprise the documents. But because I carries no sense of term order, the attacker could not reconstruct the entire file. In one embodiment, the KSWF scheme adds additional security by only displaying a small portion of the important terms and phrase from the document. This means that the attacker would only be able to ascertain how many times those specific terms and phrases appear in the document. Thus, the SKSS scheme adds more security by removing term frequencies.

An attacker monitoring the process during a search could see the resultant file identifiers that are associated with the given $Q'$. This would show an encrypted history as (C', $Q'$). However, because the attacker would not be able to discern the query (without the use of the above dictionary), this data would be of little use. Finally, attackers could also potentially attempt to alter data in C'. These attacks, however, could be recognized as the client would not be able to decrypt the data.

EXAMPLE

To evaluate the performance of S3C and provide proof of concept, the Request for Comments ("RFC") dataset was used as a test set. The set of documents contains technical notes about the Internet from various engineering groups. The dataset has a total size of 357 MB and is made up of 6,942 text files. To evaluate S3C under large scale datasets, a second dataset, the Common Crawl Corpus from AWS (a web crawl composed of over five billion web pages) was used. S3C was evaluated against the RFC using three types of metrics: Performance, Overhead, and Relevance.

Relevance is defined as how closely the returned results meet user expectations. To evaluate the relevance of the three schemes, the TREC-Style Average Precision ("TSAP") method as known in the art was used. This method is a modification of the precision-recall method commonly used for judging text retrieval systems. It is defined as follows:

$$\text{Score} = \frac{\sum_{i=0}^{N} r_i}{N} \quad (3)$$

Where i is the rank of the document determined by the system and N is the cutoff number (in one embodiment, 10 is used as the cutoff number, hence the term "TSAP@10"). $r_i$ takes three different values: $r_i=1/i$ if the document is highly relevant, $r_i=1/2i$ if the document is somewhat relevant, and $r_i=0$ if the document is irrelevant. This ranking allows for systems to be given a comparative score against other schemes in a relatively fast manner.

Performance is defined as the time it takes to perform the search operation. The performance indicators are as follows: (1) time it takes to process the user query in seconds (this includes semantic query modification and hashing into the trapdoor), (2) time it takes to search over the index in the cloud in seconds (this includes retrieving the related files from the index and ranking them based on the query), and (3) total time to perform the search in seconds (encapsulating both of the steps above, plus any additional time taken with communication over the network).

Overhead is defined as cloud server storage space taken by the hashed index and related computing. Overhead indicators include: the size of the inverted index, measured by the number of entries and the time it takes to construct the index in seconds. This operation reads the data files for the index and compiles them into a hash table. It is only performed on the cloud server startup.

Benchmark queries are derived based on the information presented in the dataset. For testing relevance, there are two categories of queries which a user may desire to search. The first category considers a user who already knows which document they are looking for, but may not remember where the document is located in their cloud or may not want to look through a large number of files to find it. Such queries are typically specific and only a small number of documents should directly pertain to them. The search system is expected to bring up these most desired documents first.

In the second category, a user who wants to find all of the documents related to an idea is considered, e.g., the nurse attempting to find all patients with a similar disease or diagnosis. Such queries would be broad with many possible related documents, and the search system should bring up the most relevant ones first.

To measure performance, time for a small (single word) query and a mid-size (three word) query are measured. Additionally, to measure the effects of expanding the size of the search query, times for queries that expanded from one word to four words is measured (taking measurements at each single word increment). Due to the inherent variety in the performance results, the mean and 95% confidence interval of 50 rounds of running each experiment are recorded.

For scalability tests, search times and storage overhead are measured for several three word queries against increasingly large portions of the dataset. Specifically, the following datasets were tested against: 500 MB, 1 GB, 5 GB, 10 GB, 25 GB, and 50 GB.

As a baseline for performance testing, a standard non-secure ("SNSS") version of the system was developed, utilizing the same semantic processing but with no encryption or hashing. Due to their similarities in indexing, the SNSS and FKSS schemes can be seen as grouped together. Both consider the entirety of the document text. Similarly, the SKSS and KSWF schemes can be grouped together because both consider a small subset of the document text.

Figure 4:
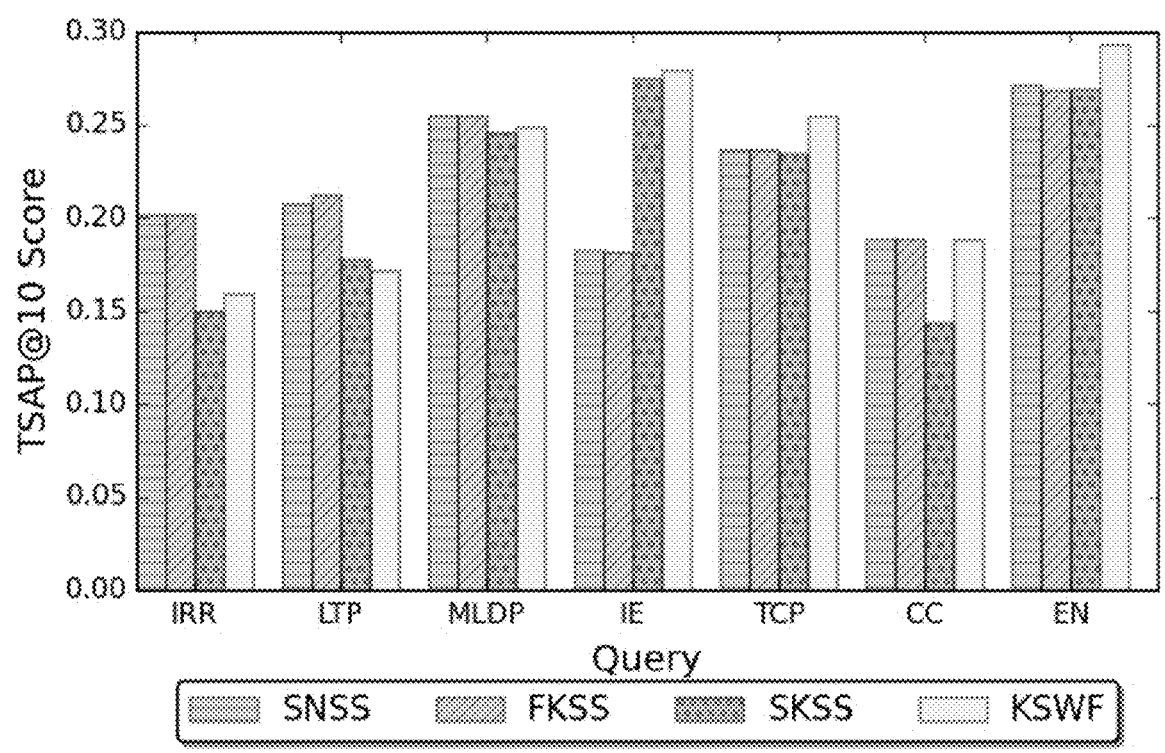
FIG. 4 is the TSAP@10 score for the specified query for each search scheme. Once the system has returned a ranked list of results, a score is computed based on a manually determined relevance each file has to the given query.

FIG. 4 shows the TSAP scores of each of the four schemes searching with each of the benchmark queries. For queries in category 1, the main desired results were ranked the highest for all schemes. The space-efficient schemes (the SKSS and KSWF), which might intuitively seem to suffer greatly in accuracy, only show to suffer a small amount when compared to the schemes that utilize the documents full text. For queries in category 2, the SKSS and KSWF schemes returned just as relevant results, and in some cases, were more relevant. Most interestingly, the KSWF scheme does not actually show much benefit from the addition of term frequency, meaning that when working with a small subset of the document's text, finding the frequency of those key phrases may be unnecessary.

In the experiment, the performance of each scheme was measured with a small (one-word) and mid-sized (three-word) query, gathering the total time it takes to perform the search. In addition, the two main components of the total search time were recorded: the time taken for query modification and the time taken to perform the index search and ranking on the cloud.

Figure 5:
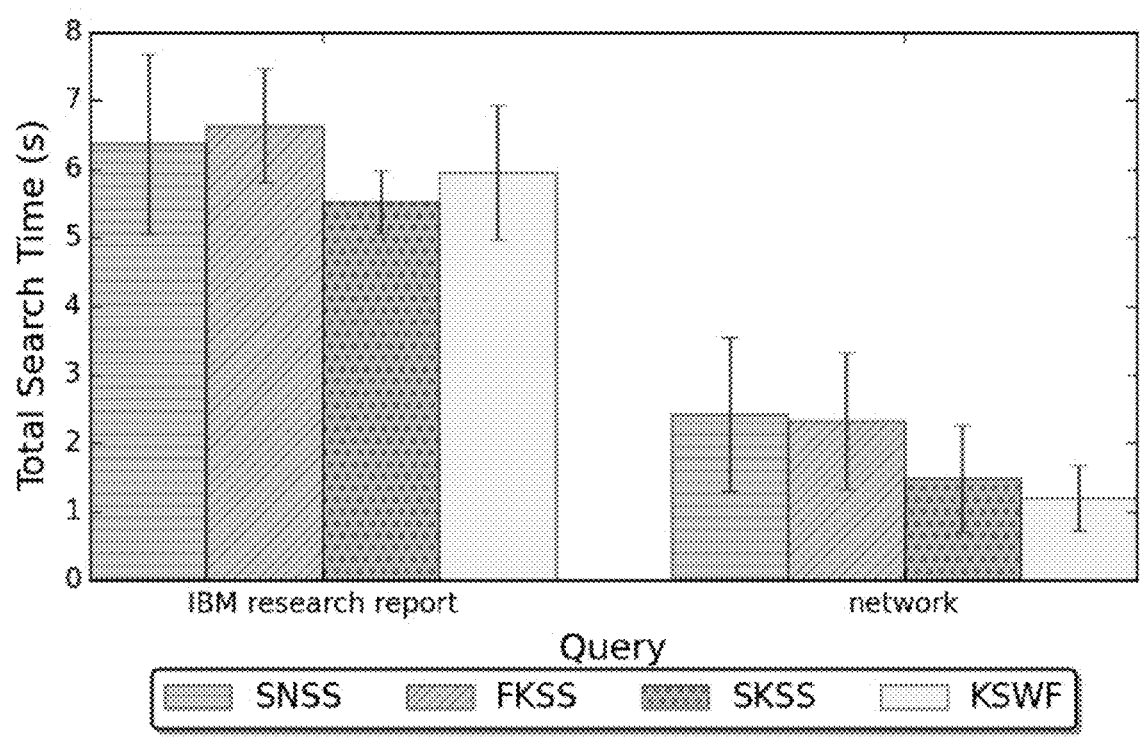
FIG. 5 is the total search time in each scheme. This includes the time taken to process the query, communicate between client and server, and perform searching over the index. The results are averaged over 50 runs.
Figure 6:
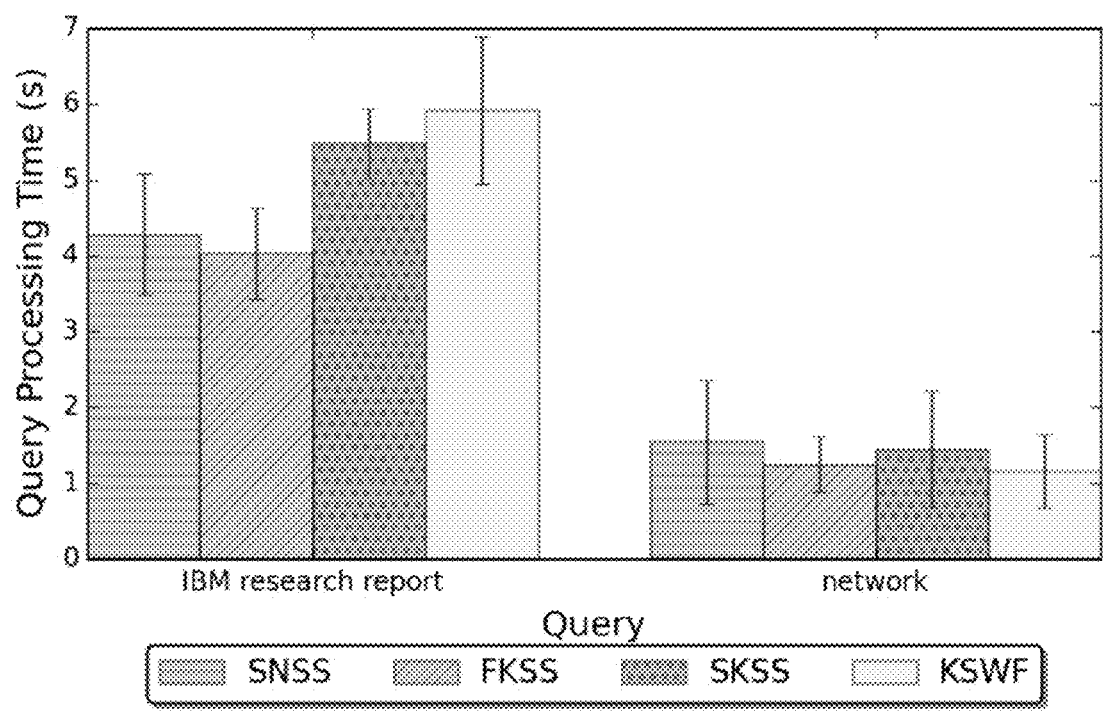
FIG. 6 is the time to process the query. This includes query modification and hashing into the trapdoor. The results are averaged over 50 runs.
Figure 7:
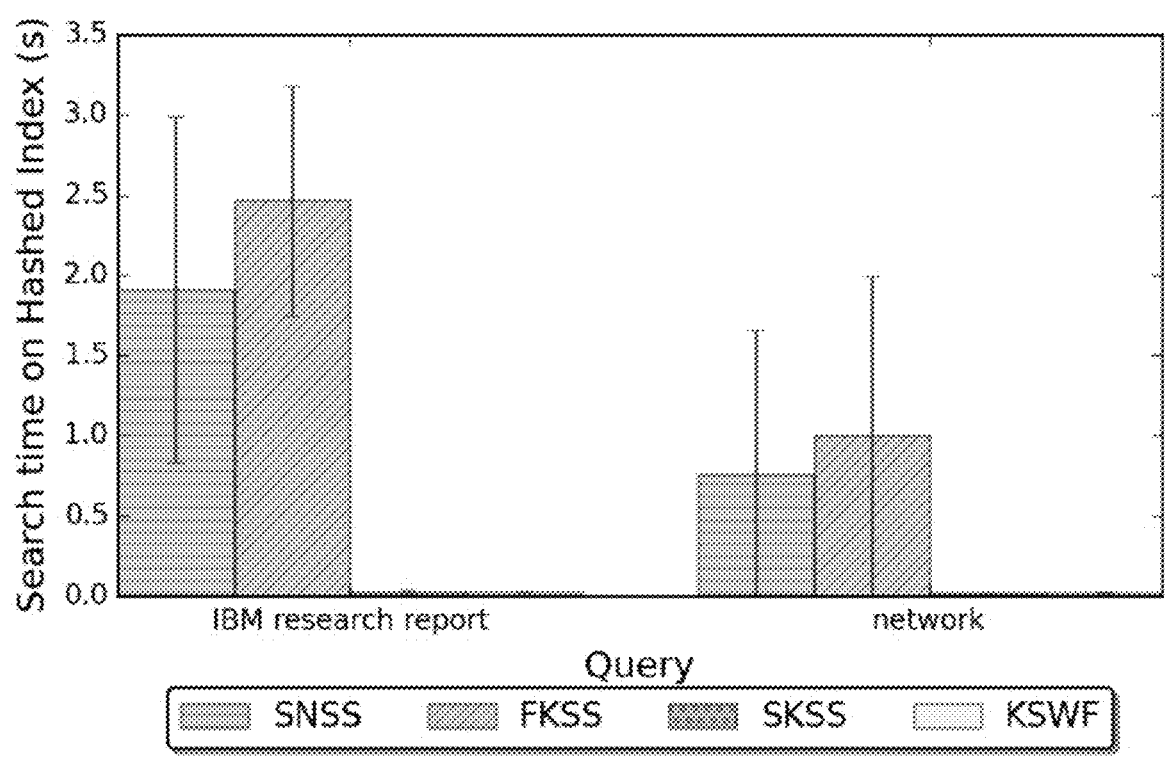
FIG. 7 is the time it takes to perform the search on the hashed index on the cloud. This includes the time taken to find all files in the hashed index that contain any hashed terms in the query trapdoor and rank them with the scheme's respective functions. The results are averaged over 50 runs.

Results can be seen in FIGS. 5, 6, and 7. As shown, all schemes are reasonably similar in terms of total search time. The majority of search time across all models is comprised of the query processing phase because S3C needs to pull information from across the Internet in the form of synonyms and Wikipedia entry downloads. SKSS and KSWF both take slightly longer to process longer queries due to the addition of the adjacent query subsets, which need to be looked up as well. Query processing time is thus linked to Internet speeds and the size of the, for example, Wikipedia entry for each of the query terms. The results indicate that under fast Internet speeds, the performance time of this system will naturally improve. While pulling information from the Internet does naturally increase search times, it is included intentionally to reduce storage size needed for the local client.

Most important to note is the difference in index searching times. The space-efficient SKSS and KSWF schemes take a near-negligible amount of time to search over the index. This can be explained by the vastly decreased index size as only key phrases are stored. This means that the initial set of potentially relevant documents is significantly smaller and the ranking equation must be run a lower number of times. Because the greatest amount of time is taken during query processing, and index search time is very small for the space-efficient schemes, these two schemes can be scaled to work on larger datasets without facing a huge growth in search time.

Figure 8:
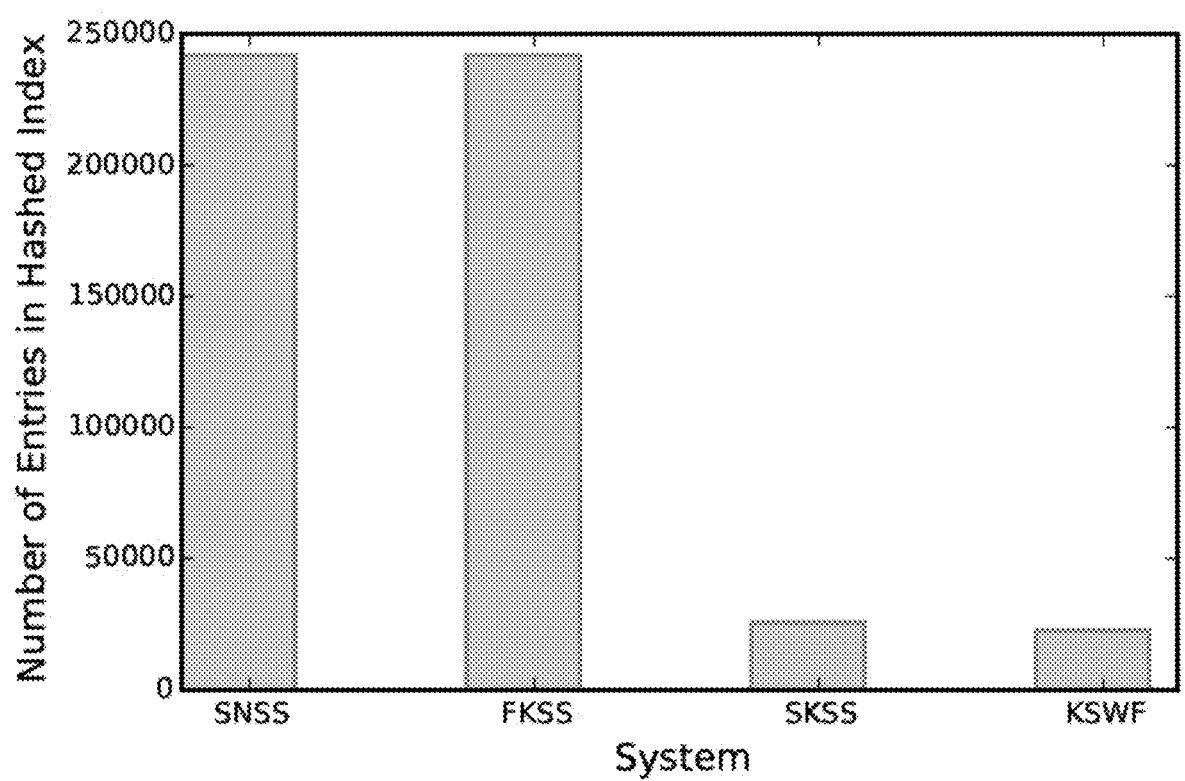
FIG. 8 is the size of the inverted index for each system. An entry denotes a hashed keyword mapped to a set of file identifiers.
Figure 9:
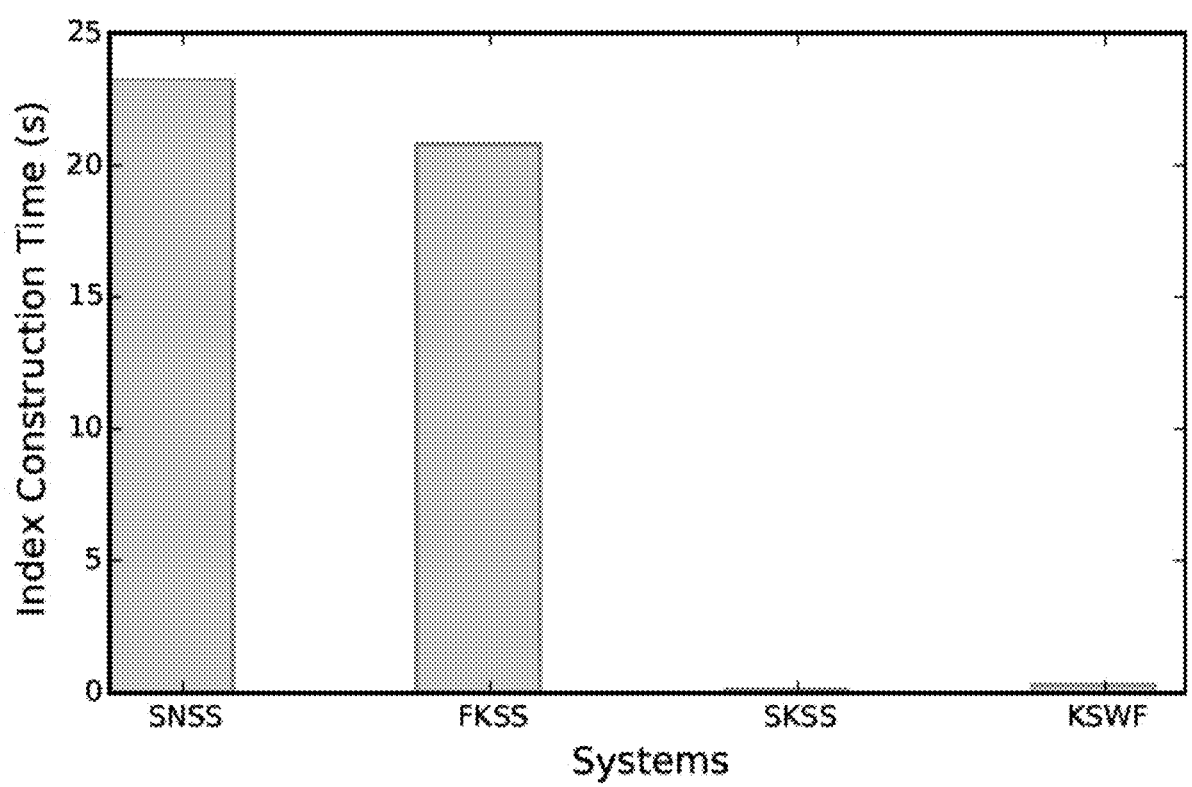
FIG. 9 is the time it takes to construct the hashed index upon server startup. This operation includes sequentially reading an index file hosted on the cloud server which contains all data for the inverted index and document sizes table and storing it in hash tables.

To demonstrate space-efficiency, the overhead for each scheme was evaluated in terms of how many entries were stored in the hashed index. These results can be seen in FIGS. 8 and 9. The two groups of schemes show a vast difference in this regard, due to the number of terms selected from each document. The linear growth per document of the index guaranteed by the constant number of key phrases extracted keeps the index small while maintaining the relevance of search results (as shown previously).

In addition, the effect that the size of the inverted index had on the time it takes to construct the index from the utility files on the server is measured. The differences are again vast, with construction times being almost negligible for SKSS and KSWF. It is worth noting that this operation needs only to be performed at startup of the cloud server, and that additions to the index at runtime operate at near constant time, regardless of the size of the dataset, due to the hash table structure of the index.

Figure 10:
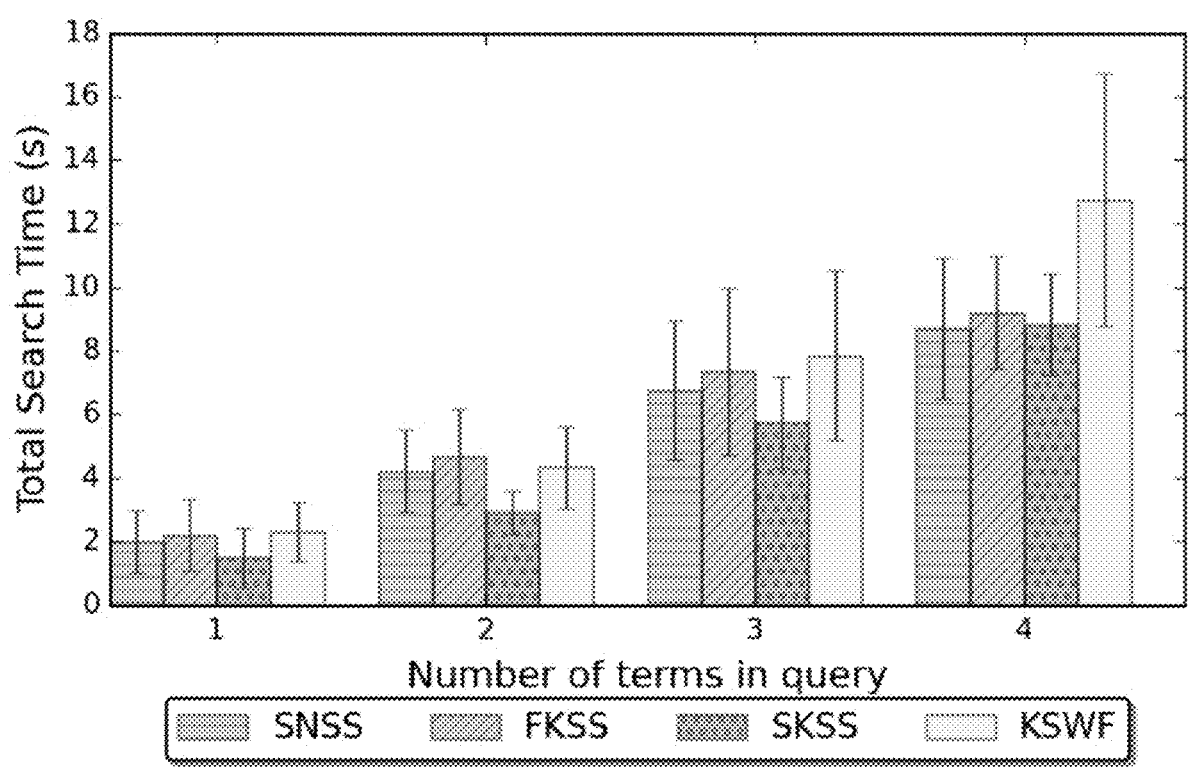
FIG. 10 is the total search time for an expanding query. This includes the time to process the search query, communicate between client and server, and rank in the cloud. The horizontal axis shows the number of words (minus stopwords) in the query. The results were averaged over 50 runs.

In addition to measuring search times for individual queries, the effect of expanding the size of a single query from one term to four is evaluated. For example, one query used in this experiment started as "protocol" which expanded to "transmission protocol" which further expanded to "transmission control protocol" which finally expanded to "network transmission control protocol." FIG. 10 shows the results of this experiment, with queries grouped by the number of meaningful terms in them (query length minus stopwords) in the horizontal axis.

In these results, the time it takes to search (vertical axis) can be seen to be linearly related to the number of meaningful terms in the query. This is because the majority of search time is taken up by the query processing phase, which grows with the number of terms in the query there are to be processed. The SKSS and KSWF schemes can be shown to have a faster growth due to the greater amount of query processing necessary as the query expands. Interestingly, SKSS consistently performs as well or better than the others despite the additional query processing. This is due to its small index size and lack of frequency data collection.

Figure 11:
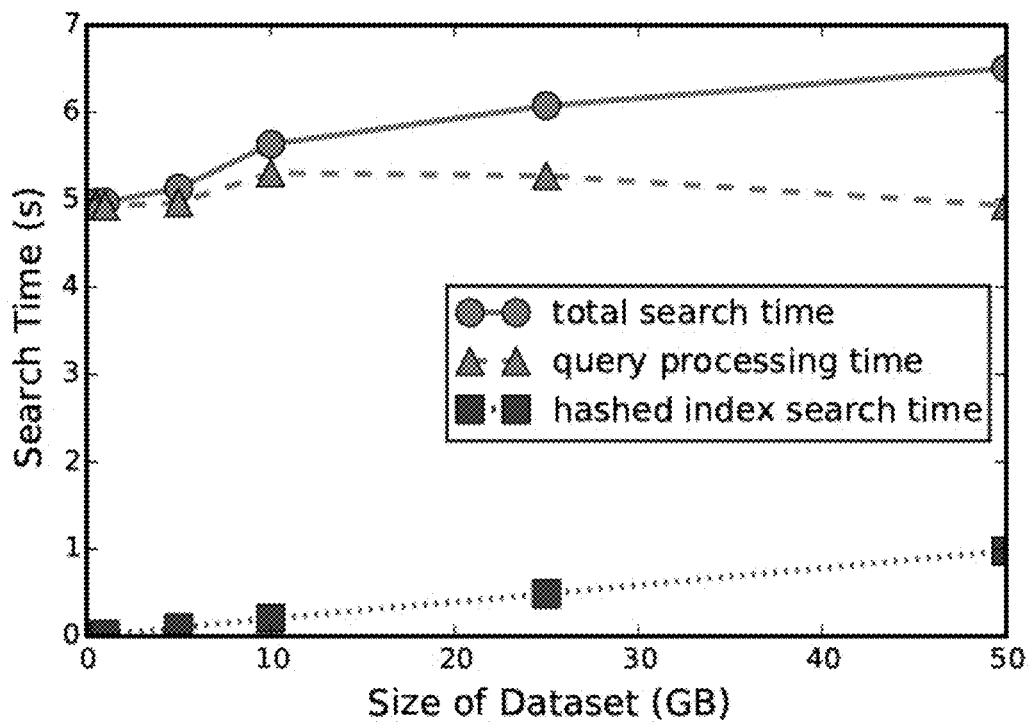
FIG. 11 is the time taken to search for different dataset sizes. Resulting times are the mean of 50 runs performed with multiple three word queries. The dotted line shows the time taken to search on the hashed index in the cloud, the dashed line shows the time taken for query modification, and the solid line shows total time taken for the search (including query modification and index searching).

To test the scalability S3C, searches were run against an increasingly large set of data. For simplicity, evaluations were only performed using the most space-efficient scheme, SKSS. The resulting search times are an average of mid-sized (three word) queries. FIG. 11 shows the results of this evaluation. These results show that as the size of the dataset increases, the time taken for query modification remains relatively constant, while the time spent searching the hashed index on the cloud increases linearly. As a result, the total search time increases by only 30.8% as the dataset increases from 500 MB to 50 GB.

Figure 12:
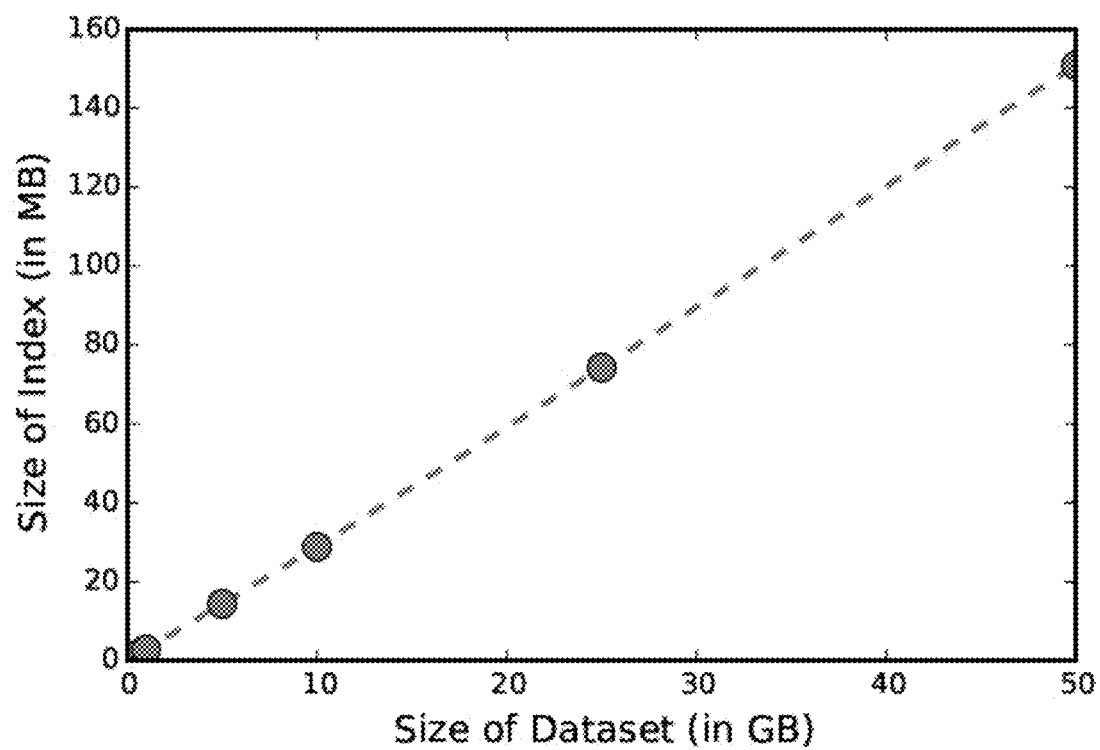
FIG. 12 is the size of the index file for different dataset sizes. The horizontal axis plots the size of the dataset used in gigabytes, while the vertical axis plots the associated index size in megabytes.

Additionally, to demonstrate the relatively low overhead provided by S3C, the size of the index was measured at each increase during the test. The results are shown in FIG. 12. Although the relation between dataset size and index size is linear, the slope is as low as 0.003. The index size always remains at ~0.3% of the size of the dataset.

In conclusion, S3C improves upon existing encrypted data search techniques by providing a solution that is space-efficient (i.e., SKSS) on both the cloud and client sides, considers the semantic meaning of the user's query, and returns a list of documents accurately ranked by their similarity to the query. Further, the semantics are achieved without the need for a highly specific semantic network to be built and maintained by the client. The system requires only a single plaintext query to be entered and is easily portable to thin-clients, making it simple and quick to use. The system is also shown to be secure and resistant to attacks.

S3C is accurate and gives reasonable performance with low overhead. Each of the scheme embodiments could be fine-tuned to certain use cases. SKSS is most relevant for documents with a mid-sized amount of encrypted text where the key phrase extraction can capture the meaning of the document well, providing a very low overhead solution. KSWF is most relevant in cases in which the slight raise in accuracy is considered worth the slight decrease in performance and security. FKSS is most relevant for small documents where the whole of the text is considered important. In addition, experiments showed that, due to low overhead, SKSS and KSWF schemes can be utilized for searching big data scale datasets.

For the purpose of understanding the ARCHITECTURE FOR SEMANTIC SEARCH OVER ENCRYPTED DATA, references are made in the text to exemplary embodiments of an ARCHITECTURE FOR SEMANTIC SEARCH OVER ENCRYPTED DATA, only some of which are described herein. It should be understood that no limitations on the scope of the invention are intended by describing these exemplary embodiments. One of ordinary skill in the art will readily appreciate that alternate but functionally equivalent components, designs, and equipment may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Reference throughout this specification to features, advantages, or similar language does not imply that all of the features and advantages that may be realized should be or are in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the described features, advantages, and characteristics may be combined in any suitable manner in one or more embodiments. One skilled in the relevant art will recognize that the ARCHITECTURE FOR SEMANTIC SEARCH OVER ENCRYPTED DATA may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

The invention claimed is:

1. A method for semantically searching over encrypted data comprising:
    a. uploading at least one document;
    b. parsing said at least one uploaded document into indexable information and an encrypted document, then transforming said indexable information into a hashed term, and writing said hashed term to a temporary key file, wherein said indexable information comprises at least one keyword from said at least one uploaded document and the frequency at which said at least one keyword appears in said at least one uploaded document;
    c. expanding an inputted plaintext query, said expanding step further comprising the steps of splitting said plaintext query to create a split query set, inserting semantic data into said split query set to create a complete query set, and weighting said complete query set to create a weighted query set, which comprises one or more query set members, wherein said weighting is based as follows: highest ranking to said plaint text query, next highest ranking to said split query set, and third highest ranking to said semantic data, wherein said semantic data is pulled from one or more advanced ontological networks;
    d. hashing said weighted query set members to create a trapdoor, which comprises one or more trapdoor members; and
    e. transmitting said trapdoor to a cloud processing server, wherein said cloud processing server checks each of said trapdoor members against said hashed index and an index of said encrypted data and ranks said trapdoor members, creating a ranked list, wherein said ranked list is generated based on said weighting.

2. A computer architecture for semantic searching over encrypted data comprising:
    a client application comprising:
    a user interface wherein a user interacts with said user interface to upload at least one document or search for at least one document, wherein said search for at least one document is performed by said user entering a query into said user interface;
    a file parser that parses said at least one uploaded document into indexable information, then transforms said indexable information into a hashed term, and then writes said hashed term to a temporary key file, wherein said indexable information comprises at least one keyword from said at least one uploaded document and the frequency at which said at least one keyword appears in said at least one uploaded document;
    an encryptor that encrypts said at least one document to create an encrypted document;
    a searching function that performs query modification on said query by splitting said query to create a split query consisting of said query and any individual parts of said query, together split query members; performs semantic expansion of said split query comprising performing key phrase extraction to retrieve related terms to at least one said split query members from at least one advanced ontological network and inserting said related terms into said split query to create an expanded split query;

a weighting function that receives said expanded split query and adds the following weighting scheme to each member of said expanded split query:

said query is weighted as 1, said individual parts of said query are weighted as 1/the number of said individual parts of said query, and said related terms as proportional to the weight of the split query member associated with said related term divided by the number of related terms associated with that same split query member;

so that a complete modified query set is created; and a cloud processing server that receives:

said temporary key file and said encrypted document and then moves said encrypted document into a cloud storage and adds said hashed terms from said temporary key file to a hashed index and performs clustering on said hashed index; and said modified query set and hashes said modified query set members to create a trapdoor and then compares said trapdoor to said hashed index to compile a list of said at least one uploaded documents that could be considered related to said query to create a list of related documents and uses a ranking engine to rank said list of related documents using the inverse document frequency for each of said documents in said list of related documents.

3. The computer architecture of claim 2 wherein said semantic expansion further comprises a synonym lookup.

4. The architecture of claim 2 wherein said client application comprises a thin device.

5. The architecture of claim 2 comprising Full Keyword Semantic Searching, wherein said indexable information comprises each individual word from said at least one uploaded document and the frequency of each of said each individual word and wherein said query modification does not comprise the step of splitting said query.

6. The architecture of claim 2 comprising Selected Keyphrase Semantic Searching, wherein said indexable information comprises a set number of keywords and phrases extracted from said at least one uploaded document and wherein said split query comprises individual key words, individual phrases, and all subsets of the combination of individual key words and individual phrases.

7. The architecture of claim 2 comprising a Keyphrase Searching with Frequency, wherein said indexable information comprises a set number of keywords and phrases extracted from said at least one uploaded document and the frequency of each of said keywords and phrases; and wherein said split query comprises individual key words, individual phrases, and all subsets of the combination of individual key words and individual phrases.

8. The system of claim 2 wherein said clustering is topic-based clustering.

* * * * *